(No Model.)
G. L. WITSIL.
ROLLER SKATE.
No. 257,426. Patented May 2, 1882.
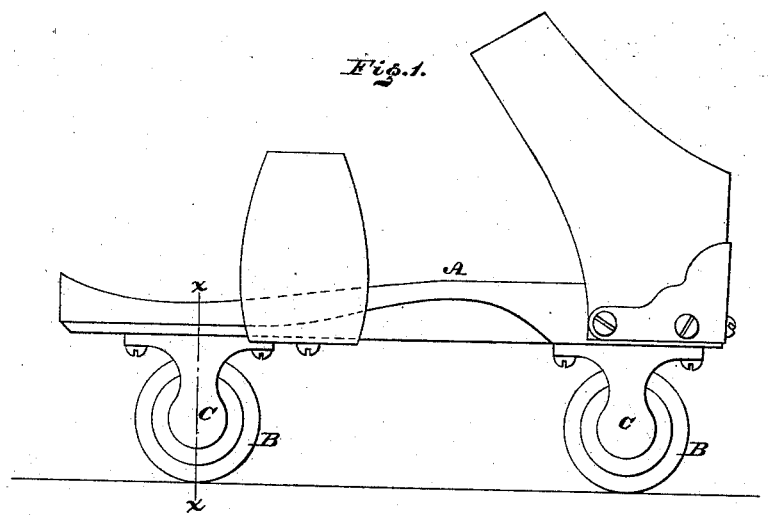
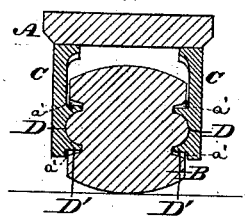
WITNESSES:
L. Douville
W. F. Kircher
INVENTOR:
George L. Witsil,
BY John A. Wiedersheim
ATTORNEY.
N. PETERS, Photo-Lithographer, Washington, D. C.

UNITED STATES PATENT OFFICE.

GEORGE L. WITSIL, OF PHILADELPHIA, PENNSYLVANIA, ASSIGNOR TO EDWARD C. EDWARDS, OF BROOKLYN, NEW YORK.

ROLLER-SKATE.

SPECIFICATION forming part of Letters Patent No. 257,426, dated May 2, 1882.

Application filed November 22, 1881. (No model.)

*To all whom it may concern:*

Be it known that I, GEORGE L. WITSIL, a citizen of the United States, residing in the city and county of Philadelphia, State of Pennsylvania, have invented a new and useful Improvement in Roller-Skates, which improvement is fully set forth in the following specification and accompanying drawings, in which—

Figure 1 is a side elevation of the roller-skate embodying my invention. Fig. 2 is a vertical section in line $x\ x$, Fig. 1.

Similar letters of reference indicate corresponding parts in the two figures.

My invention consists of a roller-skate having spheroidal rollers, whereby provision is made for the lateral motions in skating and change of direction, said rollers being mounted in brackets which are rigidly secured to the foot-rest, the rollers having integral gudgeons and the brackets having integral bearings, thus providing strong and reliable connections of the rollers and brackets with the foot-rests.

It also consists of a novel construction of the rollers and their bearings, whereby the strength of the rollers and bearings is increased.

Referring to the drawings, A represents the foot-rest of a roller-skate and B the rollers thereof. Depending from the under side of the rest are brackets C, to which the rollers B are journaled by means of gudgeons D, which enter bearings D' on the brackets C, said gudgeons D projecting from the sides of the rollers and the bearings D' being on the inner faces of the brackets and integral therewith. The rollers B are of spheroidal form, of wood or other suitable material, and the gudgeons D are integral therewith, whereby the body of each roller is left solid, and consequently strong and durable. The bearings D' of the brackets are countersunk, so as to receive the gudgeons; but the sides of the rollers may be countersunk at their centers and the gudgeons formed on the brackets. In either case the centers of the rollers are not pierced through and weakened to receive pintles or axial rods.

It will be seen in Fig. 2 that the gudgeons D are flush with the sides of the rollers. This is occasioned by said gudgeons being set back or set into the sides of the rollers, thus leaving a groove, $a'$, around each gudgeon, into which projects the encircling raised edge of the corresponding bearing D'. By this construction the strength of the connection of the rollers and brackets is increased and the rollers are not liable to break away from the brackets.

When the skates are secured to the feet they may be operated as usual. As the body of the skater sways to the right or left, or it is desired to change the direction of skating and the body is thrown to the right or left, the skates are thereby inclined and the rollers, without shifting their bearings or moving the brackets C, roll, owing to their spheroidal form, on new places of their curved peripheries, whereby the motion of skating and change of direction are readily accomplished, it being noticed there is obviated the employment of pivotal brackets, which are weak, liable to break, and expensive.

Having thus described my invention, what I claim as new, and desire to secure by Letters Patent, is—

1. In a roller-skate, the combination, with the foot-rest, of spheroidal rollers having integral gudgeons and brackets having integral bearings, substantially as and for the purpose set forth.

2. The rollers having gudgeons set into the sides thereof and grooves surrounding said gudgeons, in combination with the brackets having bearings which enter said grooves and encircle the gudgeons, substantially as and for the purpose set forth.

3. The combination, in a roller-skate, of rollers with gudgeons, and brackets with countersunk bearings for said gudgeons, substantially as and for the purpose set forth.

GEO. L. WITSIL.

Witnesses:
JOHN A. WIEDERSHEIM,
W. F. KIRCHER.